United States Patent
Spurlock et al.

(10) Patent No.: US 11,399,033 B2
(45) Date of Patent: Jul. 26, 2022

(54) MALICIOUS ADVERTISEMENT PROTECTION

(71) Applicant: McAfee, LLC, San Jose, CA (US)

(72) Inventors: Joel R. Spurlock, Portland, OR (US); Nikhil Meshram, Hillsboro, OR (US); Prashanth Palasamudram Ramagopal, Portland, OR (US); Daniel L. Burke, Portland, OR (US)

(73) Assignee: McAfee, LLC, San Jose, CA (US)

( * ) Notice: Subject to any disclaimer, the term of this patent is extended or adjusted under 35 U.S.C. 154(b) by 447 days.

(21) Appl. No.: 16/451,185

(22) Filed: Jun. 25, 2019

(65) Prior Publication Data
US 2020/0412744 A1 Dec. 31, 2020

(51) Int. Cl.
*H04L 9/40* (2022.01)
*G06K 9/62* (2022.01)
*G06N 20/00* (2019.01)

(52) U.S. Cl.
CPC ........ *H04L 63/1408* (2013.01); *G06K 9/6256* (2013.01); *G06N 20/00* (2019.01); *H04L 63/1433* (2013.01); *H04L 63/1483* (2013.01)

(58) Field of Classification Search
CPC ............. H04L 63/1408; H04L 63/1433; H04L 63/1483; G06N 20/00; G06K 9/6256
See application file for complete search history.

(56) References Cited

U.S. PATENT DOCUMENTS

| | | | |
|---|---|---|---|
| 8,516,590 B1* | 8/2013 | Ranadive | H04L 63/1483 726/24 |
| 9,027,140 B1* | 5/2015 | Watkins | G06F 21/56 726/24 |
| 9,578,044 B1* | 2/2017 | Sharma | H04L 63/1416 |
| 10,223,616 B1* | 3/2019 | Malin | G06N 3/08 |
| 10,445,770 B2* | 10/2019 | Schroeder | G06Q 30/0248 |
| 10,678,923 B1* | 6/2020 | Siev | G06F 21/566 |
| 10,699,295 B1* | 6/2020 | Le Chevalier | G06F 16/951 |
| 2006/0253458 A1* | 11/2006 | Dixon | H04L 63/1483 |
| 2010/0042504 A1* | 2/2010 | Shenfield | G06Q 30/02 705/14.73 |
| 2011/0035800 A1* | 2/2011 | Atcha | G06F 21/566 726/22 |
| 2011/0161145 A1* | 6/2011 | Mahajan | G06Q 30/0241 705/14.4 |
| 2012/0197711 A1* | 8/2012 | Zhou | G06Q 30/0242 705/14.41 |
| 2016/0140611 A1* | 5/2016 | Schler | G06F 16/9535 705/14.55 |

(Continued)

*Primary Examiner* — Hee K Song
(74) *Attorney, Agent, or Firm* — Patent Capital Group

(57) ABSTRACT

There is disclosed in one example an advertisement reputation server, including: a hardware platform including a processor and a memory; a network interface; and an advertisement reputation engine including instructions encoded in memory to instruct the processor to: receive via the network interface a plurality of advertisement instances displayed on client devices; extract from the advertisement instances an advertiser identifier; analyze one or more advertisements associated with the advertiser identifier to assign an advertiser reputation; and publish via the network interface advertisement reputation information derived from the reputation for the advertiser identifier.

19 Claims, 10 Drawing Sheets

(56) References Cited

U.S. PATENT DOCUMENTS

2016/0164819 A1* 6/2016 Shrivastava ............ H04L 63/10
  709/206
2017/0193545 A1* 7/2017 Zhou .................. G06Q 30/0243
2018/0109537 A1* 4/2018 Schmidt ................ G06Q 50/01

* cited by examiner

MALICIOUS ADVERTISEMENT PROTECTION

FIELD OF THE SPECIFICATION

This application relates in general to computer security, and more particularly, though not exclusively, to a system and method for providing malicious advertisement protection.

BACKGROUND

Modern computing ecosystems often include "always on" broadband Internet connections. These connections leave computing devices exposed to the Internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
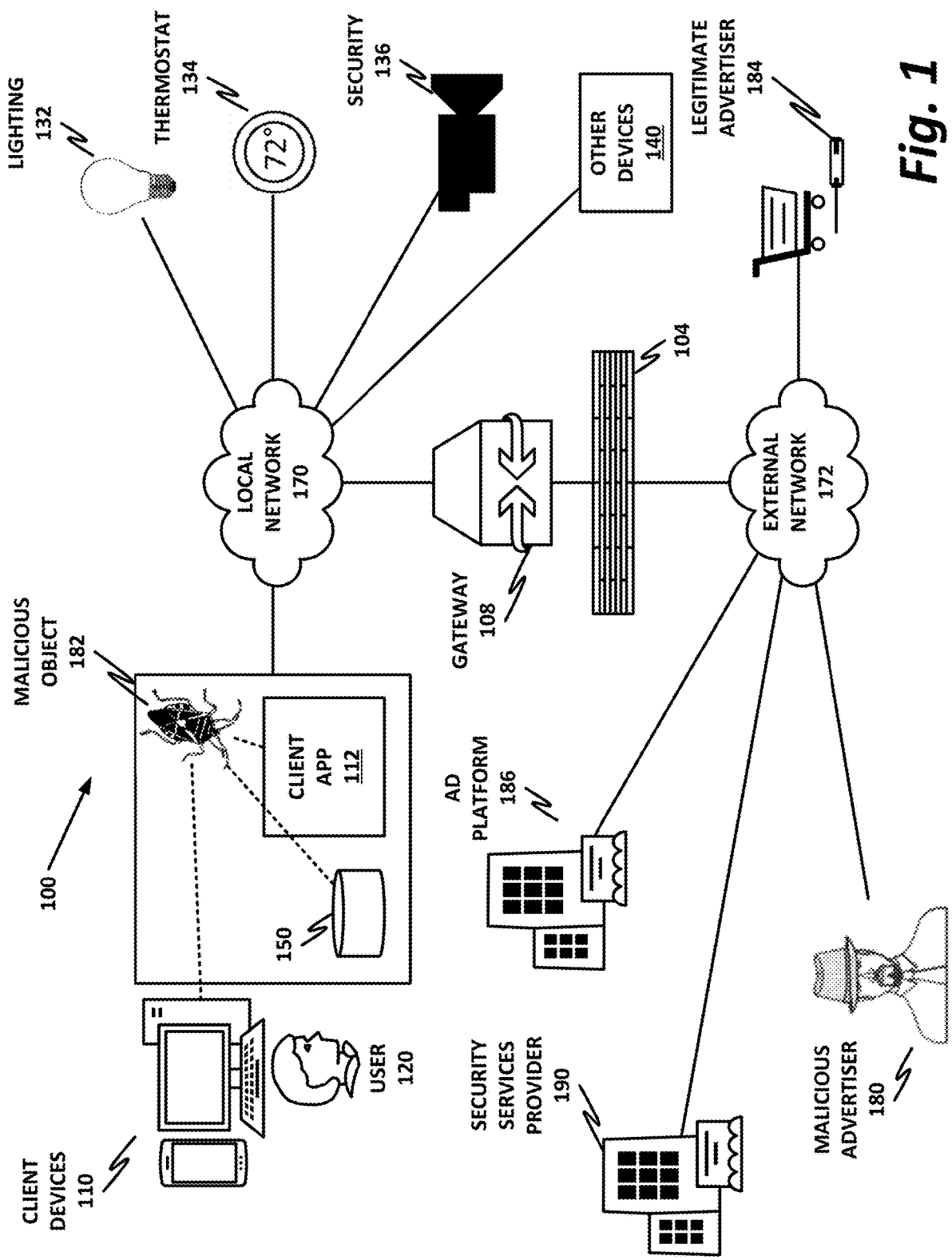
FIG. 1 is a block diagram illustrating selected elements of a security ecosystem.

In an example, there is disclosed an advertisement reputation server, comprising: a hardware platform comprising a processor and a memory; a network interface; and an advertisement reputation engine comprising instructions encoded in memory to instruct the processor to: receive via the network interface a plurality of advertisement instances displayed on client devices; extract from the advertisement instances an advertiser identifier; analyze one or more advertisements associated with the advertiser identifier to assign an advertiser reputation; and publish via the network interface advertisement reputation information derived from the reputation for the advertisement identifier.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Advertising is an integral part of many modern mobile and web business models. Commonly, a web platform or a mobile application will sell ad space to advertisers, who pay for impressions, click-throughs, purchases, or on some other basis. In many cases, consumers have a relatively complicated relationship with the advertisements. Sometimes, the advertisements are relevant to the user and desirable, and the users are happy to receive the advertisements because it keeps their apps and platforms free. On the other hand, some advertisements are obnoxious, misleading, unwanted, or in some cases even malicious.

While undesirable, intrusive, or otherwise unwanted advertisements may be annoying to the user, they may be considered to be a cost of a "free" application or service. But malicious advertisements present entirely different issues.

For online advertising, advertisers primarily pay for a service that depends on the number of ad impressions and/or the number of ad clicks. This can lead to ad providers using misleading techniques to entice users to click on these ads. Software or services may be delivered through download links on websites. Ads may be delivered by displaying some bold image that the user clicks on if he or she is interested in it. These ads are usually delivered through third-party services whose content is minimally inspected, if at all, and payment is managed as a click-through. Each vendor may have some unique identifier with the ad service provider that is used for tracking clicks and corresponding payments. The revenue models for many of these services on the Internet, available through mobile devices or computing devices, depend on advertising. This has led, in some cases, to the creation of policies where platform providers (e.g., Google, Yahoo, and America Online) ban the use of ad blockers. This ensures the continued viability of the advertising model.

But the anonymous nature of online advertisements may be exploited by malware authors to entice users into downloading and installing malicious payloads. They may also entice users to visit a site that contains exploits, or redirect users of the ads to "phishing" websites, or to other socially-engineered attack links. Malware authors may then exploit the user behavior of clicking on ads or links to a download button to maliciously deliver malware to unsuspecting victims. Despite these threats, not all advertisers police malicious advertisements.

The present specification describes a security architecture to solve the issue of malicious advertisements without interfering with the advertising business model. A security agent acting on a client device, such as a mobile device or a desktop computer, may interact with a security services provider and a global or enterprise security server to identify malicious ads and malicious ad providers. The desired outcome is to block or suppress malicious advertising content without impacting legitimate advertising vendors or revenue streams. Notably, in at least some embodiments, legitimate advertisers may include advertisers that provide unwanted, obnoxious, or even misleading advertisements, so long as the behavior of those advertisements does not cross over into the realm of malware.

It is recognized herein that historically, advertisements are given a certain degree of latitude for puffing, bolstering, or self-laudatory claims that are not necessarily objectively verifiable. The distinction between subjective hyperbole and objectively false statements can provide considerable latitude to advertisers. The terms "objectively false" and "objectively verifiable" imply a generally-accepted factual standard that can be independently tested. Superlative adjectives provide advertisers with the means to promote products and services in a manner that is readily understood by potential customers, while avoiding the risk of prosecution under laws that specifically prohibit false advertising. By way of nonlimiting example, these may include descriptive but non-specific terms such as "better," "best," "greatest," "cleanest," "gentlest," etc. In general, advertisements that include such language but are not determined to pose a significant risk to an end user's personal information or to an end user device may be considered permissible.

Advertising that is used to spread malware is also known as "malvertising." This is the practice of injecting otherwise legitimate, web-based ads with malicious software, code, objects, and other executable instructions designed to compromise computer systems, generally with little to no user interaction required. Malvertising can appear on any web site, including legitimate advertising networks, which may lack the ability to discriminate between harmful and benign ads. A typical malvertising attack may exploit the complex nature of the internet by using injected code to initiate multiple redirections (e.g., from a legitimate web-based publisher to ad exchanges, ad servers, retargeting networks, and content delivery networks) to deliver users to malicious web sites.

Blocking malicious advertisements while passing legitimate advertisements, including unwanted or obnoxious advertisements, is important to protecting the advertising-based model of many platforms. In the case of misleading advertisements, there may be a threshold above which a misleading advertisement becomes a phishing attack, or other socially-engineered attack. Such an advertisement may be deemed a phishing attack if it attempts to compromise network or device security, obtain user or enterprise information without authorization, or to collect money from a user without providing some legally cognizable consideration. Stated otherwise, a "misleading" advertisement may be permissible as long as it does not engage in some form of legally actionable fraud.

Note, however, that the foregoing describes merely one embodiment of the present specification. Other embodiments of the specification may also define different thresholds for marking an ad as permissible or not permissible. In particular, an advertiser and/or an associated advertisement may be assigned a reputation. The reputation could be assigned on a traditional "white," "black," or "gray" basis, wherein the correlating advertisement may be whitelisted, blacklisted, or questionable. In other embodiments, different gradations of reputation may be assigned, or a nonlinear reputation may be assigned. For example, reputations could include factors such as "desirable," "undesirable," "subtle," "bold," "obnoxious," "intrusive," or reputations could correspond to a user's particular preferences, indicating whether that particular user finds the ad desirable.

Embodiments of the specification may use a combination of user behavior, activity context, and features derived from the advertisement and subsequent system behavior in a classification algorithm. The classification algorithm may be any suitable algorithm, and in some embodiments may include a machine learning algorithm such as Random Forest, which produces a reputation for the advertisement and/or the advertiser.

The advertisement and its reputation may be correlated with the advertising vendor through a tracking identifier. The tracking identifier could be, for example, a tuple comprising an advertiser platform identifier, and a global unique identifier (GUID) assigned to the advertiser by the platform.

Data from the set of advertisements and devices associated with a single advertising vendor may be used globally or across an enterprise to establish a reputation for the vendor, itself. With the reputation of the advertisement and the reputation of the vendor, this system may block or alert on malicious reputation ads, and/or ads provided by malicious reputation advertisers.

This system can work across multiple platforms, including mobile, chat, social media, desktops, enterprise, or any other ad-supported service or other service that provides ads. The system is particularly applicable to cases where advertisements are delivered to the customer through a third-party payment model. This system may also be used to publish a "blacklist" of ad providers or advertisements that could be used across the industry to mitigate malicious behavior by bad actors.

In an illustrative method, a sensor on the target device is used to extract features from the ad being served. The device may send telemetry to the cloud (i.e., a global or enterprise threat intelligence server). The telemetry may include features from the ad, and may be used by the security server to classify ad providers and advertisements using behavior analytics, reputations for ad providers, and machine learning classification algorithms. Once a feature score is calculated for the telemetry data, the score may be used to classify the set of ads or advertisers into a trusted set and a malicious set.

In some embodiments, to ensure real-time responsiveness of the system, ad reputations may be cached on the client side so that when advertisements are encountered, the system may classify them responsively. In some cases, an advertisement or advertiser may be encountered with an unknown reputation. In that case, it may not be considered safe to run the advertisement on the system until it is assigned a known reputation. In that case, the unknown advertisement may be quarantined, such as by sandboxing or virtualizing the browser or application instance receiving the ad, so that the ad can be displayed without posing a danger to the rest of the system.

In computing a reputation, the system may employ features like a time to close (TTC), which may also be referred to as a time to live (TTL) before the ad is closed, the ad URL, the age of the advertisement, the prevalence of the advertisement, and other factors that may indicate, individually or in a cross-section, the trustworthiness of the ad. This system may also establish a reputation for an advertising provider using a combination of behavior analytics and feature extractions from the ad. Ad provider trust may also be established or modified, according to consensus or crowdsourcing reputations. It should be noted that when an advertiser is marked as malicious, this may not mean that the advertiser is necessarily malicious for all time. For example, a legitimate advertiser may be compromised and start pushing malicious ads. If the legitimate advertiser is notified of this situation, remedies the situation, and begins pushing out legitimate ads, then after a sufficient time of providing legitimate ads, the advertiser may once again receive a positive or "whitelisted" reputation. When an advertisement or an advertiser has a negative or "blacklisted" reputation, this reputation may be used to block the ad and/or alert a user or security administrator for the device or the enterprise of the malicious activity.

The approach described in this specification realizes advantages over at least some prior art embodiments. For example, blocking ads completely may violate license agreements for many platforms, and disrupt legitimate revenue streams for some services. The system described herein, however, does not block legitimate ads, and thus does not impinge on legitimate revenue streams or end user license agreements (EULAs).

This system also realizes advantages in comparison to systems that use a security solution to identify the payload, itself. This can be very expensive in terms of processing time, as the number of objects that must be inspected, and the behavior required to detect all the variations of payload, can become very complex. Furthermore, unwinding any attack in progress where the payload has already started applying is significantly more complex. This often happens in the case of network threats. In contrast, targeting the advertiser detects the source of the malicious payload, thus resulting in detecting the payload before it executes and minimizing adverse impact. Furthermore, the number of discrete advertisers is orders of magnitude smaller than the number of discrete advertisements or payloads, thus making an advertiser-centered approach highly efficient.

The system of the present specification also realizes advantages over devices that invest heavily in sensors and platform-specific behavioral analytics. These systems may use the sensors and behavioral analytics to try to intercept threats that are already executing, or to stop them before execution. However, this approach has vulnerabilities in light of the contemporary reality that a majority of malware may enter a device through the browser. This is becoming increasingly common as more devices and applications move to the cloud, and users interact with their devices and applications via a browser rather than on native hardware or via an operating system (OS)-native application. It is therefore beneficial to establish trust among ad providers. If an ad provider is trusted by consensus or crowd reputation, then it is more likely to not serve malicious ads. Furthermore, advertiser reputations can help consolidate some of the workflows associated with identifying malicious ads. When one or more malicious ads are analyzed and determined to be malicious, they can be associated with their advertiser. This may include, for example, a tuple of a platform ID and GUID associated with the specific advertiser. In other examples, other identifiers could be used. Once the advertiser is identified as malicious or potentially malicious, the advertiser may be subjected to additional scrutiny. If this additional scrutiny indicates that the advertiser is in fact malicious, then advertisements from that advertiser can be blocked en masse, rather than being individually analyzed and scrutinized.

This creates a platform-independent presence in the browser that is capable of detecting threats. This provides, by way of illustrative and nonlimiting example:
HTML protection
Script protection
URL protection
ActiveX (or other plugin) protection
Download insights The system described herein minimizes dependence on getting a classification from the cloud, and can instead rely on metadata from the cloud or cloud-based whitelisting. Embodiments of this specification include three components or modules. These can include an identifier module that uses machine learning to identify malicious ads. A second module may be a behavior analytics module. A third module may be a reputation module or reputation store for ad providers.

Advantageously, the system disclosed herein is capable of detecting malicious attacks, even when they do not include malicious payloads. Some social engineering attacks may, for example, use "pop-up" browser windows or other intrusive means to deliver messages meant to convince the user to dial a phone number of a false debt collection entity (e.g., a fake IRS contact, or other illegitimate creditor). Users who call may be asked to provide sensitive personal or financial information, which can be used for fraud or identity theft. These types of phishing attacks are resistant to traditional malware analysis because the "payload" is not a script or binary, but instead relies on credulous human interaction to deliver results to the attacker. Such attacks can, however, be flagged in embodiments of the present disclosure using a source reputation or other features. This source reputation can be informed by features not traditionally included in malware scanners, such as crowdsourced reputations, and heuristic analysis of the advertisements and the users' interactions with them (e.g., spawning many child windows, or users quickly/immediately closing windows).

A system and method for providing malicious advertisement protection will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. Embodiments of security ecosystem 100 may be configured or adapted to provide the method of malicious advertisement protection as disclosed in the present specification.

In the example of FIG. 1, security ecosystem 100 may be an enterprise, a government entity, a data center, a telecommunications provider, a "smart home" with computers, smart phones, and various Internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the Internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the Internet. Local network 170 may also provide access to an external network, such as the Internet, via external network 172. External network 172 may similarly be any suitable type of network.

Local network 170 may connect to the Internet via gateway 108, which may be responsible, among other things, for providing a logical boundary between home network 172 and external network 170. Local network 170 may also provide services such as dynamic host configuration protocol (DHCP), gateway services, router services, and switching services, and may act as a security portal across local boundary 104.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, a malicious advertiser 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of user 120 to successfully operate devices on local network 170 without interference from malicious advertiser 180. Malicious advertiser 180 may target malicious ads to user 120, while legitimate advertiser 184 may target legitimate ads to user 120. As described above, legitimate advertisements from legitimate advertiser 184 may include any advertisement that does not install malware, does not surreptitiously collect user information, does not tamper with the network, or that does not include misleading content that rises to the level of legally actionable fraud.

In a further example, malicious advertiser 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for malicious advertiser 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of malicious advertiser 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, malicious advertiser 180 may also want to commit industrial or other espionage, such as stealing classified or proprietary data, stealing identities, or gaining unauthorized access to enterprise resources. Thus, malicious advertiser 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for malicious advertiser 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

User 120 may operate client devices 110 that include applications, websites, or other content utilizing an advertising business model. As described above, client app 112 need not be a native application, but may in fact be a web interface to a cloud application, or may be a user's access to a website. Legitimate advertiser 184 serves legitimate ads to client devices 110, and the user can, for example, ignore, dismiss, or otherwise interact with the advertisements.

Advertising platform 186 hosts advertisements from legitimate advertiser 184. However, malicious advertiser 180 may also try to interject malicious advertisements into advertising platform 186.

Advertising platform 186 may have its own identifier such as a URL or some other identifier that identifies advertising platform 186 to client application 112. Advertising platform 186 may also assign to each advertiser a GUID that identifies that advertiser, often anonymously. Different advertising platforms may assign different IDs to the same advertiser. Thus, a specific advertiser can be uniquely identified by the tuple of advertiser platform ID and advertiser GUID. However, this may not be the only identity assignable to the advertiser. The advertiser could work through pseudonyms or shell companies, or the advertiser could advertise on different advertising platforms. In that case, the advertiser may have a unique ID for each platform.

If user 120 is a home or individual user, then user 120 may subscribe to services provided by security services provider 190 to mitigate the danger of malicious advertising. Similarly, if user 120 is an enterprise user, then security services provider 190 may be an enterprise security department, in which case an enterprise security server may be provided. Security services provider 190 may wish to allow legitimate advertisers 184 to advertise on advertising platform 186, while blocking malicious advertiser 180.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
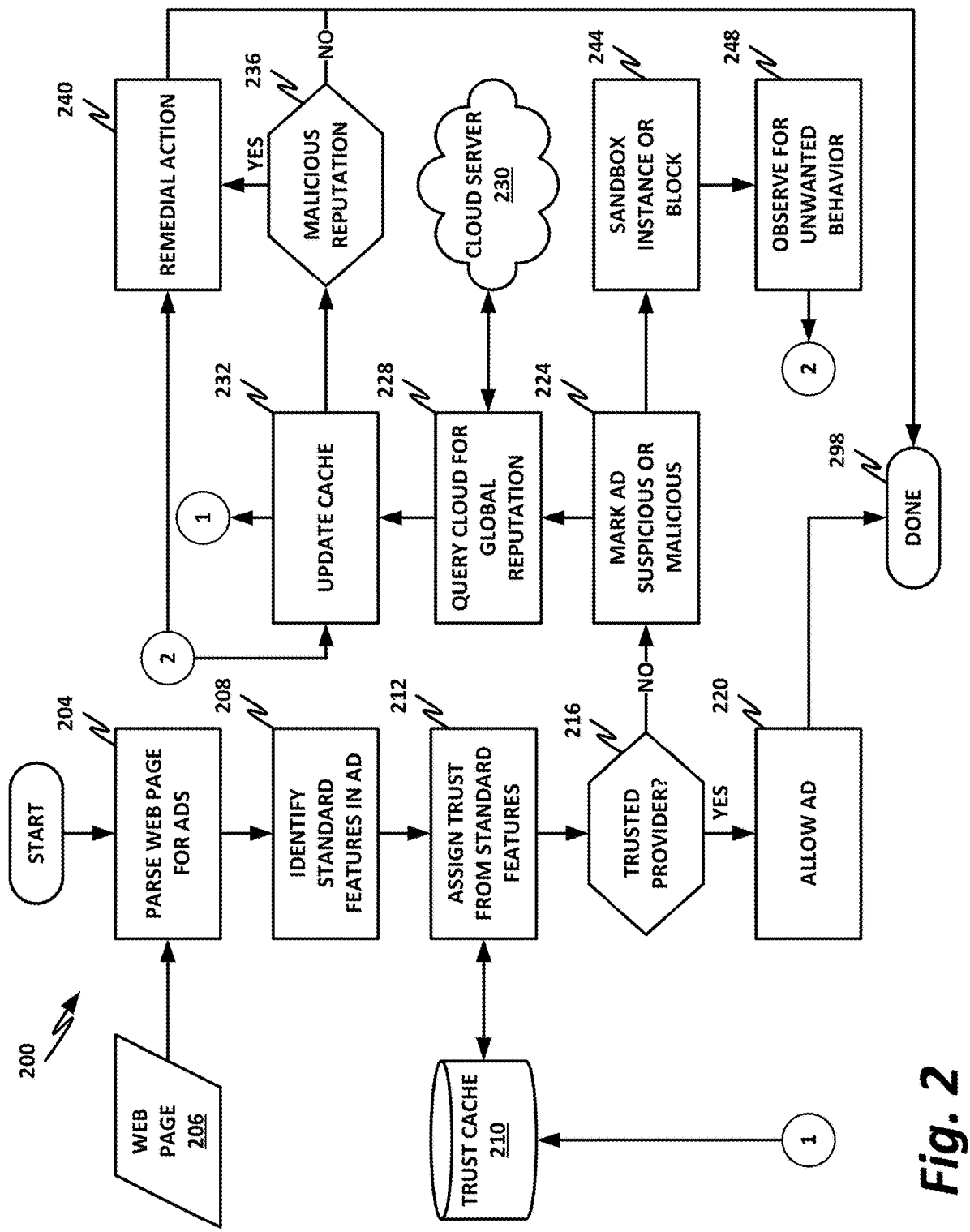
FIG. 2 is a flowchart of a method of mitigating a malicious advertisement threat on a client device.

FIG. 2 is a flowchart of a method 200 of mitigating a malicious advertisement threat on a client device. This method may be carried out on a device such as client devices 110 of FIG. 1, or any other suitable client device. In this example, the functions of the client device are shown as being separated from the functions of a security server device. However, this division is provided by way of illustrative example only. In other cases, the entire security infrastructure could be provided on a single device.

Starting a block 204, a security engine on the client device receives a webpage 206, and parses the webpage for advertisements. These advertisements could include both legitimate and malicious advertisements.

In block 208, the security agent identifies standard features within the advertisement. These features may include, for example, features discussed in FIG. 5a below, or other features that may be useful in determining whether or not an ad is malicious, or in otherwise assigning the ad a reputation.

In block 212, the security agent queries a trust cache 210 for any known trust information or reputation for the advertiser or for an advertiser associated with the advertisement. Based on this information, the security agent may assign a trust score based on the reputation, or if a cached reputation is not available, a reputation may be assigned based on a cross-section of standard features such as those illustrated in FIG. 5a, or other suitable features.

In decision block 216, the security agent determines whether the provider is a trusted provider, or whether the advertisement under analysis is a trusted advertisement.

If the advertisement is trusted or the provider is trusted, then in block 220, the ad is allowed to display and the user is permitted to interact with the ad, and in block 298, the method is done.

Returning to decision block 216, if the advertisement or the associated advertiser are not trusted, then in block 224, the ad is either suspicious or malicious. If the ad has a known reputation of being malicious, then the procedure shown here may be followed, or the advertisement may simply be blocked outright.

Assuming that the ad is to be run, then in block 244, the security agent may sandbox the instance, block the ad, quarantine the ad, or otherwise take some remedial action that mitigates the potentially malicious advertisement's ability to harm the user or the system. If the ad is sandboxed and allowed to run, then in block 248, the security agent may observe the advertisement for any unwanted or suspicious behavior. This suspicious behavior may be used in block 232 to update trust cache 210, and in block 240 may lead to a remedial action. The path following blocks 224, 244, 248, and 240 may in some instances represent a trade-off between security and convenience. If a query to the cloud and deep analysis of the advertisement are required every time an unknown ad or advertiser is encountered, this may significantly affect the user's experience. However, there is also danger in simply permitting every ad of unknown reputation to simply run on the system. Thus, by sandboxing or quarantining the browser instance, adequate security can be maintained while maintaining also a responsive experience for the end user.

On the backend, a further process may be followed. Proceeding from block 224, the security agent in block 228 may query cloud server 230 for a global reputation for the unknown object. If cloud server 230 returns with a known global reputation for the object, then in block 232, the security agent updates trust cache 210.

Once trust cache 210 is updated, in decision block 236, the security agent determines whether the returned known reputation was malicious or not. If the known reputation returned by cloud server 230 was malicious, then in block 240, the system may take remedial action. Remedial action could include sandboxing the browser instance, quarantining the instance, warning the end user, warning a security administrator for the enterprise, providing telemetry to a security services provider, initiating a scan of the computer for malicious activity, or any other remedial action that is appropriate to the instance.

If the reputation returned in block 228 is not malicious but instead is trusted, then the instance of the ad is trusted and is permitted to run, and in block 298, the method is done.

Note that it is also possible in block 228 for cloud server 230 to return an unknown reputation for the unknown object. In that case, the security agent may continue to treat the object as having an unknown reputation for the time being. Asynchronously, cloud server 230 may analyze the object and compute a reputation, and may later return a reputation that may then be cached in trust cache 210. When that occurs, the security agent may then use the cached reputation the next time that the object is encountered.

Figure 3:
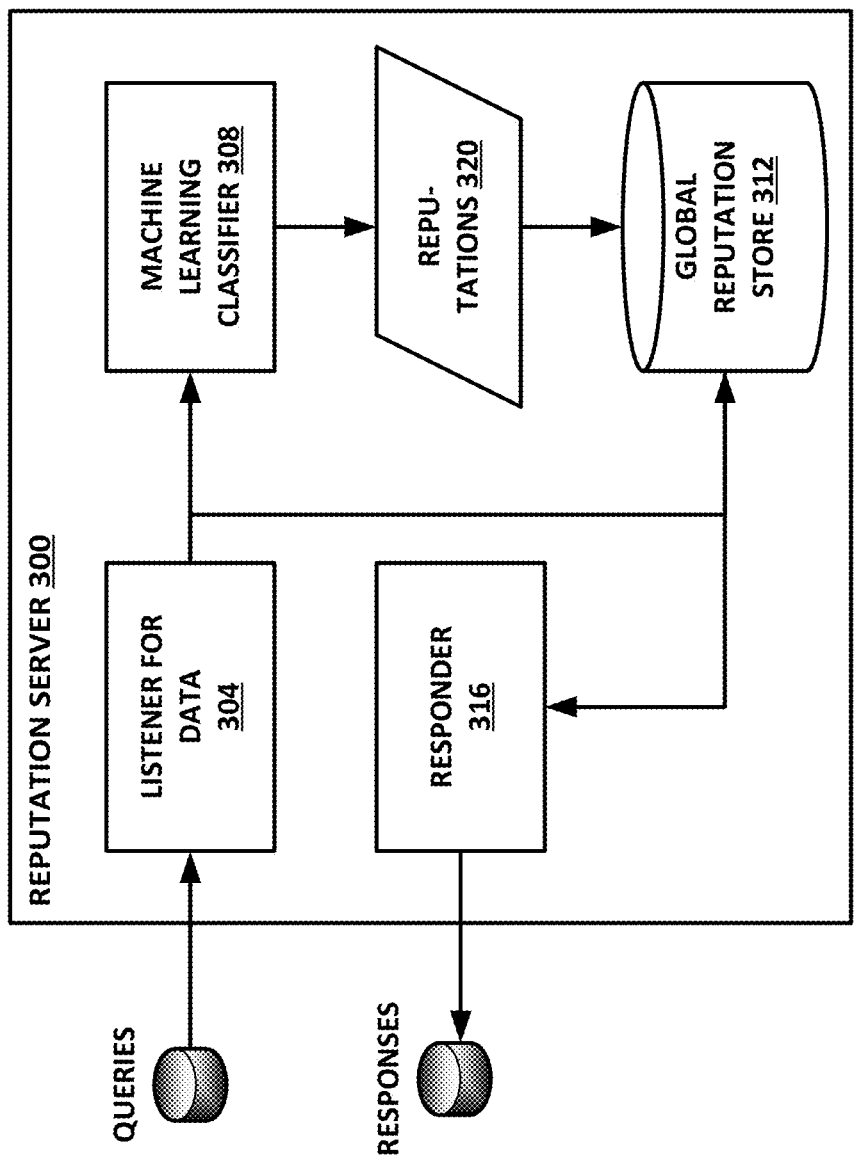
FIG. 3 is a block diagram illustrating selected elements of a reputation server.

FIG. 3 is a block diagram of selected elements of a reputation server 300. Reputation server 300 may be, for example, a cloud server such as cloud server 230, a global security server, an enterprise security server, or any other server architecture. It is also possible to implement reputation server 300 on the same hardware as the client device performing method 200 of FIG. 2.

In this example, reputation server 300 includes a listener for data 304. Listener for data 304 receives queries from one or more client devices. These queries may include telemetry, metadata, and other information about advertisers or advertisements encountered by the client devices. Depending on the context, the telemetry may include an advertising platform ID, an advertiser ID or GUID, the actual content of the advertisement, metadata about the advertisement, or any other information that may be collected in a particular embodiment.

Listener for data 304 provides the telemetry data to a machine learning classifier 308. Optionally, listener for data 304 may also interact directly with group global reputation store 312, in the case that the telemetry identifies an advertiser or advertisement with an already-known reputation score.

Listener for data 304 provides telemetry data to machine learning classifier 308, which may analyze the advertisement to assign or update a reputation score for the advertiser and/or for the advertisement. New or updated reputations 320 may then be provided to global reputation store 312, where they are stored.

Responder 316 uses global reputation store 312, reputations 320, and any other information available to it to provide an appropriate response to the requesting device.

Machine learning classifier 308 can use any suitable algorithm to perform the classification. One purpose of machine learning classifier 308 is to identify malicious ads by establishing a trusted database (such as global reputation store 332) to assign advertisers and advertisements a global, enterprise, and/or local reputation score. As discussed above, machine learning classifier 308 identifies malicious advertisements and deceptive ads based at least in part on a provider reputation. The reputation may include, in some examples, a domain URL, which could be used to identify an unrated ad provider versus a rated ad provider.

In some examples, the age or prevalence of the advertisement may be used as an input to the reputation score. For example, a browser process ID (PID) may be used to track the advertisement being displayed, and any changes to the advertisement. Machine learning techniques may be used to give a reputation to an ad provider, and/or to block malicious content.

Establishing a trust score or reputation for an ad provider may include a combination of behavioral analytics and feature extraction. Features extracted could include, by way of illustrative and nonlimiting example:
  Timing of the browser opening the ad
  Number of times a particular ad is clicked
  Time to close an ad by the user
  The URL of the advertisement
  Age of prevalence for the advertisement
  Size of the banner or the screen space that an ad occupies
  Ad provider certificates In some examples, machine learning classifier 308 could use a machine learning algorithm like Random Forest to distinguish between trusted and malicious ad providers. The features listed above could be used with feature weighting to provide a cost function that gives a score to the ad provider. The score may be used to establish the machine learning trust score to differentiate between malicious and trusted advertisements and/or advertisers.

In some examples, instead of maintaining a whitelist or blacklist of individual ads being served, reputation server 300 may rely on a reputation of the advertisement based on user behavior. Machine learning could be used to discriminate between malicious and non-malicious content.

An operational principle of the trust model used by reputation server 300 is that trust is easy to lose and hard to earn. If an ad provider is to be trusted, it may need to build its credibility by displaying a history of non-malicious ads over a period of time. Once a pattern of non-malicious advertisement is established, the advertiser can be treated as trusted. On the other hand, it may take only a very few malicious advertisements to switch the advertiser's reputation to untrusted. In some cases, a security services provider could interface with an advertising provider that desires to keep a trusted reputation. If the security services provider determines that the advertiser has begun serving malicious content, the security services provider may contact the advertiser to discuss what has caused the negative reputation, and to discuss steps that may be taken to remedy the situation. A legitimate advertiser may want to remedy such a situation to ensure that it remains a trusted advertiser. A non-legitimate advertiser may not be interested in remedying the situation because it is deliberately trying to serve malicious ads. Thus, the fact of an advertiser being willing to work with the security services provider (or not) may, itself, be a factor in the trust score for that advertiser.

Machine learning classifier 308 may use a combination of behavioral analytics and feature extractions to establish a reputation for an advertiser and/or an advertisement. In some examples, heuristics and crowdsourcing may be used to establish a trusted advertiser set and a malicious advertiser set. Advertisement features could include the following:
  Timing of the browser opening the ad
  Number of times the ad is clicked
  Time to live (TTL) before the ad is closed, or in other words, time to close (TTC)
  Ad URL
  Age of ad
  Prevalence of advertisement All of these may contribute to a score being calculated by feature weighting. For example, a feature score may be calculated according to:

$$\Sigma_{k=0}^{n} C^k \Theta^k$$

In the above equation, n represents the number of features, C is the feature weighting value (from 0 to 1), and $\Theta$ is a particular ad feature.

Once a feature score is calculated for the telemetry data, the score may be fed to a classification algorithm such as Random Forest or some other suitable classification algorithm. The telemetry data may be divided into a trusted set and a malicious set within global reputation store 312. It should be noted, however, that "trusted" and "untrusted" are provided as nonlimiting examples, only. In other cases, a more gradated trust score could be provided, or a nonlinear trust score that tracks a plurality of factors, such as user interest, subtlety of the ad, intrusiveness of the ad, relevance of the ad, and any other factor could also be computed.

As discussed above, once an advertiser receives a reputation as malicious, that reputation need not persist for all time. The malicious reputation may, itself, have a TTL, which may be treated in some cases as a minimum time that the advertiser is "blacklisted." Once that TTL has expired, additional analysis may be used to determine whether the advertiser has begun serving legitimate ads, again. If the previously malicious advertiser begins serving non-malicious advertisements, then after a sufficient period of time (e.g., the TTL), the advertiser may receive a trusted reputation.

Figure 4:
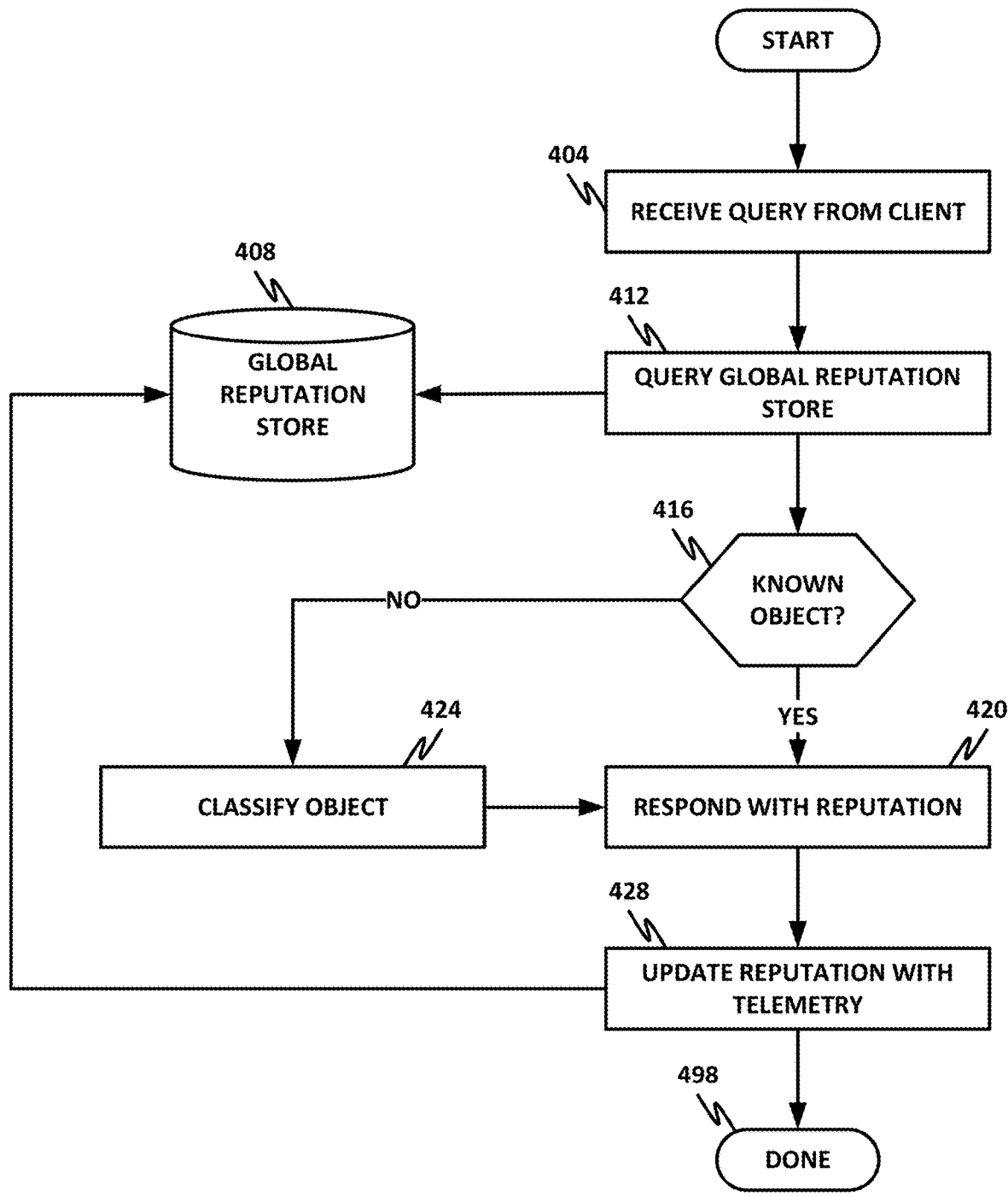
FIG. 4 is a flowchart of a method that may be performed by a reputation server.

FIG. 4 is a flowchart of a method 400 that may be performed by a reputation server such as reputation server 300 of FIG. 3, or any other suitable reputation server.

Starting in block 404, the reputation server receives a query from a client. As discussed above, the query from the client could include telemetry and/or metadata about an ad, as well as a request for a reputation for the advertisement, or for an advertiser associated with the advertisement.

In block 412, the reputation server queries a global reputation store 408. Global reputation store 408 may be an example of global reputation store 312 of FIG. 3, or some other same or different reputation store. The reputation server receives from global reputation store 408 a reputation for the advertisement or the advertiser.

In decision block 416, the reputation server determines whether the queried object has a known reputation. For example, if global reputation store 408 received a known reputation of "malicious" or "trusted," then in block 420, the reputation server may respond to the client device with the known reputation.

Returning to decision block 416, if the queried object does not have a known reputation, then additional analysis may be used in block 424 to classify the object. This could include, for example, submitting the object to deeper analysis by a machine learning classifier such as machine learning classifier 308 of FIG. 3, or other classifier module.

Once the machine learning classifier has classified the object, then in block 420, the reputation server may respond to the client device with a reputation for the object.

In block 428, the reputation server may also update global reputation store 408 with telemetry provided with the query. For example, one of the factors that a machine learning classifier may use is the prevalence of the ad. Thus, a large number of queries for an identical or nearly identical advertisement may be used as a data point by the machine learning classifier. This can represent, for example, a new advertising campaign. When a legitimate advertiser with legitimate goods or services launches a new product, the advertiser may engage in a large advertising campaign and push out a large number of ads to advertise the new product. Thus, a highly prevalent ad may indicate a large advertising campaign, and may thus be useful in identifying a legitimate ad. In contrast, phishing malware is not interested in a large number of ad impressions, because it does not want to pay for a large number of ad impressions. The phishing attacker wants to send out the minimal number of ads to achieve the desired result of catching some number of naïve persons who are willing to respond to the phishing attack. Thus, having a low prevalence may weigh against the legitimacy of an ad. But it should be noted that prevalence is only one factor. For example, a small company pushing legitimate ads may still have a very low prevalence because they are small and are engaged in a small and targeted advertising campaign. Such an advertisement should not be marked as malicious simply because it has a low prevalence. Rather, prevalence in this case, like the other factors listed above, may be used as a single data point in a large cross-section of heuristic analysis that can be used to classify advertisements.

In block 498, the method is done.

Figure 5A:
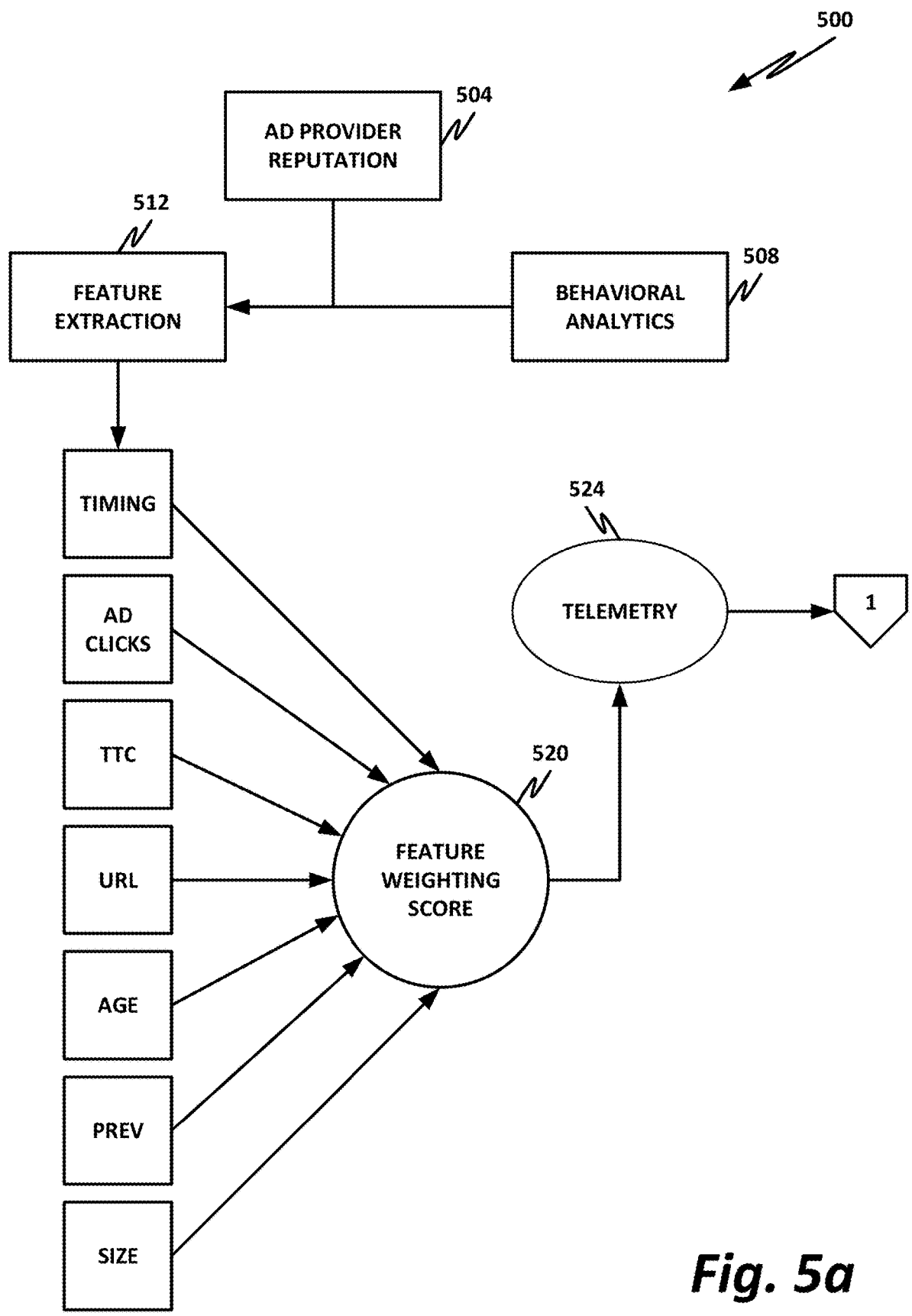
FIGS. 5a and 5b provide a block diagram of a machine learning module.
Figure 5B:
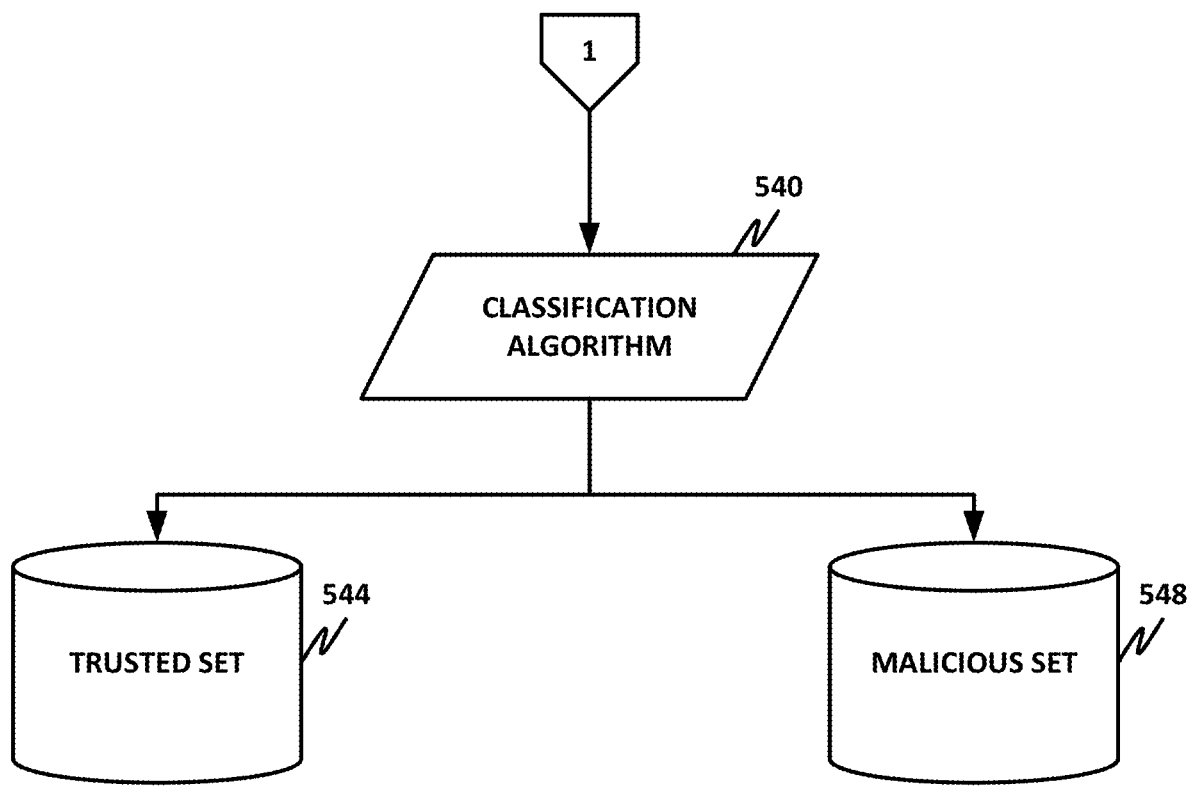

FIGS. 5a and 5b provide a block diagram of a machine learning module that may be used in accordance with embodiments of the system taught in this specification.

In this example, machine learning module 500 has an ad provider reputation module 504, and a behavioral analytics module 508. Each of these modules may be an "engine" as used throughout this specification, and may include data and other logic elements that inform reputation analysis.

Block 512 is a feature extraction module that may also be an engine, and that receives reputation data and behavioral analytics data from ad provider reputation module 504 and behavioral analytics module 508, respectively.

Feature extraction 512 may extract a number of features that may be used either individually or in a cross-section to analyze an advertisement or advertiser, and to assign a reputation score to the advertisement or advertiser. The features extracted may include, by way of illustrative and nonlimiting example, timing (e.g., the timing of the browser opening the ad), ad clicks (e.g., the number of times an ad is clicked by a user versus the number of times it is ignored by the user), time to close (e.g., time before the ad is closed by the user), the advertisement URL, the age of the ad, the prevalence of the ad, and the size of the ad.

The timing of the browser opening the ad may be instructive, because it can indicate things like the latency between the advertising platform and the browser, as well as the size of the ad (e.g., a larger ad will take much larger to open). The number of times the ad is clicked can indicate trustworthiness, because if an ad is malicious or appears suspicious, fewer users may click on the ad. If the ad is non-malicious and highly relevant, more users may click on the ad. The time to close may be relevant because many users may try to quickly close malicious, obnoxious, obtrusive, or interfering advertisements. For example, the advertisement may spawn a large number of pop-ups that a user must try to close very quickly to continue using the device. This kind of behavior is more common in illegitimate ads than in legitimate ads.

The advertisement URL may be checked against a database such as a GTI database, an enterprise threat intelligence database, or some other intelligence database that may include a list of known malicious URLs. Furthermore, some URLs are structurally suspicious, because they contain unusual sequences linking to domain names that are not understandable by a human, and that are often temporary and frequently changed.

The age of the ad may also be indicative of legitimacy. An ad that has been around for a long time is generally less likely to be malicious, because malware actors tend to frequently change their advertisements to try to stay ahead of security services.

As discussed above, the prevalence of the ad may be instructive, because it can be indicative of a large ad campaign, versus a very small, targeted phishing campaign.

The size of the advertisement may be instructive, because excessively large advertisements may contain hidden payloads. For example, steganography may be used to encode a payload within an innocuous-appearing image such as a JPEG or a PNG. The ad may then provide content that tries to trick a user into launching the malicious payload. In other examples, crypto mining payloads could be embedded within advertisements. In the case of advertisement size, it may not only be the raw size of the advertisement that matters, but also the size of the advertisement in relation to its apparent dimensions. For example, a JPEG image that has dimensions of 300×300 pixels may be expected to be of a certain size, generally under approximately 1 MB. If a 100×100 JPEG image comes in at 12 MB, it may be deemed suspicious, and may include some embedded payload. For the size of the image, or the physical pixel size of the advertisement on the screen, there may be an upper threshold of size. If the image exceeds the upper threshold of size, then the image size may be counted as a negative factor in the reputation score for the advertisement.

A cross-section of features may be provided as a feature weighting score 520, calculated, for example, according to the formula $\Sigma_{k=0}^{n} C^k \Theta^k$, as discussed in FIG. 3. This may be provided as telemetry 524. Following off-page connector 1 to FIG. 5b, telemetry 524 may be provided to classification algorithm 540. Classification algorithm 540 then scores the advertisement or the advertiser, and assigns the advertisement or advertiser to a trusted set 544 or a malicious set 548, or assigns some other gradated or nonlinear score to the advertisement or advertiser.

Figure 6:
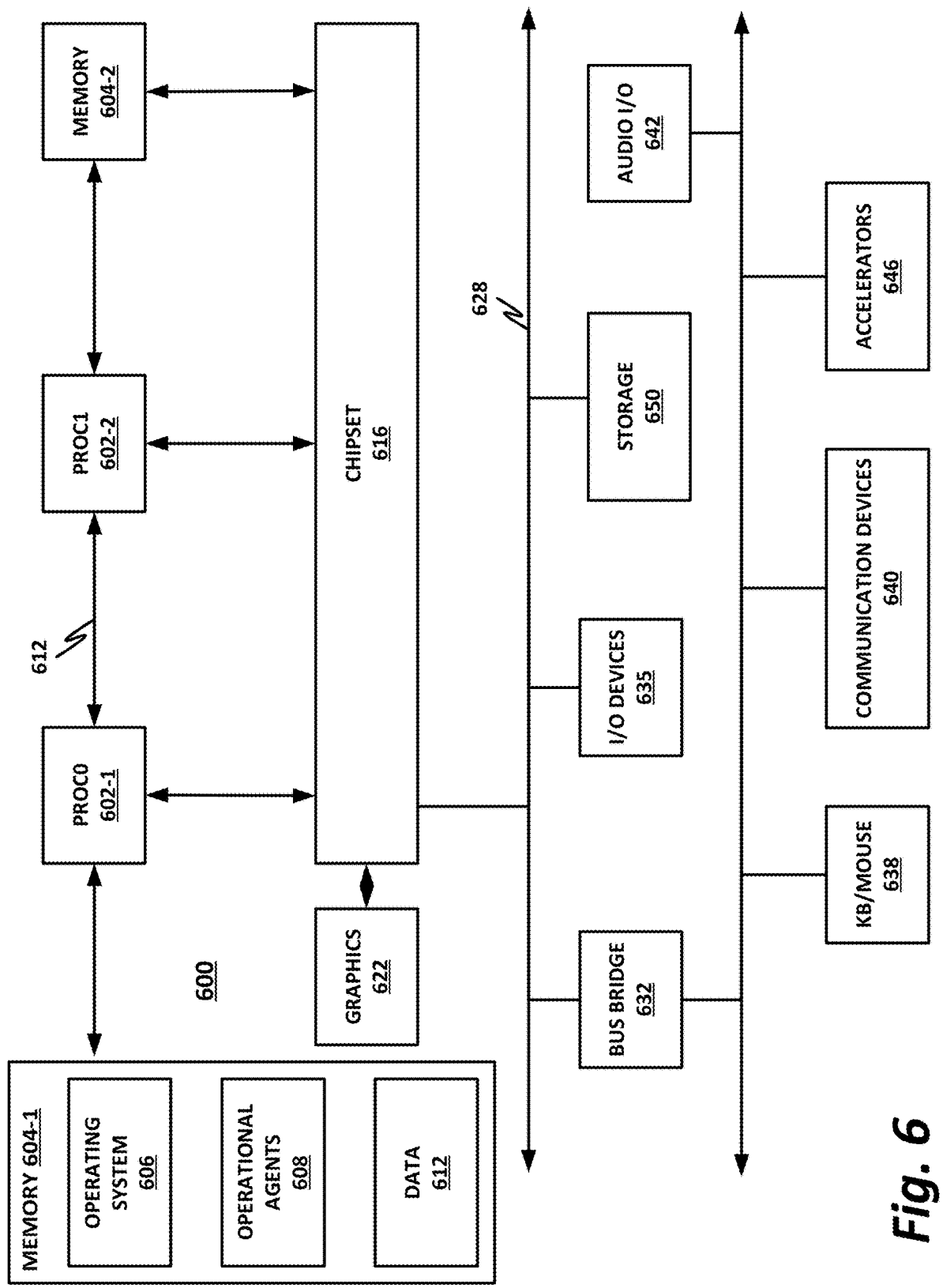
FIG. 6 is a block diagram of selected elements of a hardware platform.

FIG. 6 is a block diagram of a hardware platform 600. Embodiments of hardware platform 600 may be configured or adapted to provide the method of malicious advertisement protection as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 600, even though they may be scattered across a data center, or even located in different data centers.

Hardware platform 600 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, Internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 600 is arranged in a point-to-point (PtP) configuration. This PtP configuration is popular for personal computer (PC) and server-type devices, although it is not so limited, and any other bus type may be used.

Hardware platform 600 is an example of a platform that may be used to implement embodiments of the teachings of this specification. For example, instructions could be stored in storage 650. Instructions could also be transmitted to the hardware platform in an ethereal form, such as via network interface 648, or retrieved from another source via any suitable interconnect. Once received (from any source), the instructions may be loaded into memory 604, and may then be executed by one or more processor 602 to provide elements such as an operating system 606, operational agents 608, or data 612.

Figure 8:
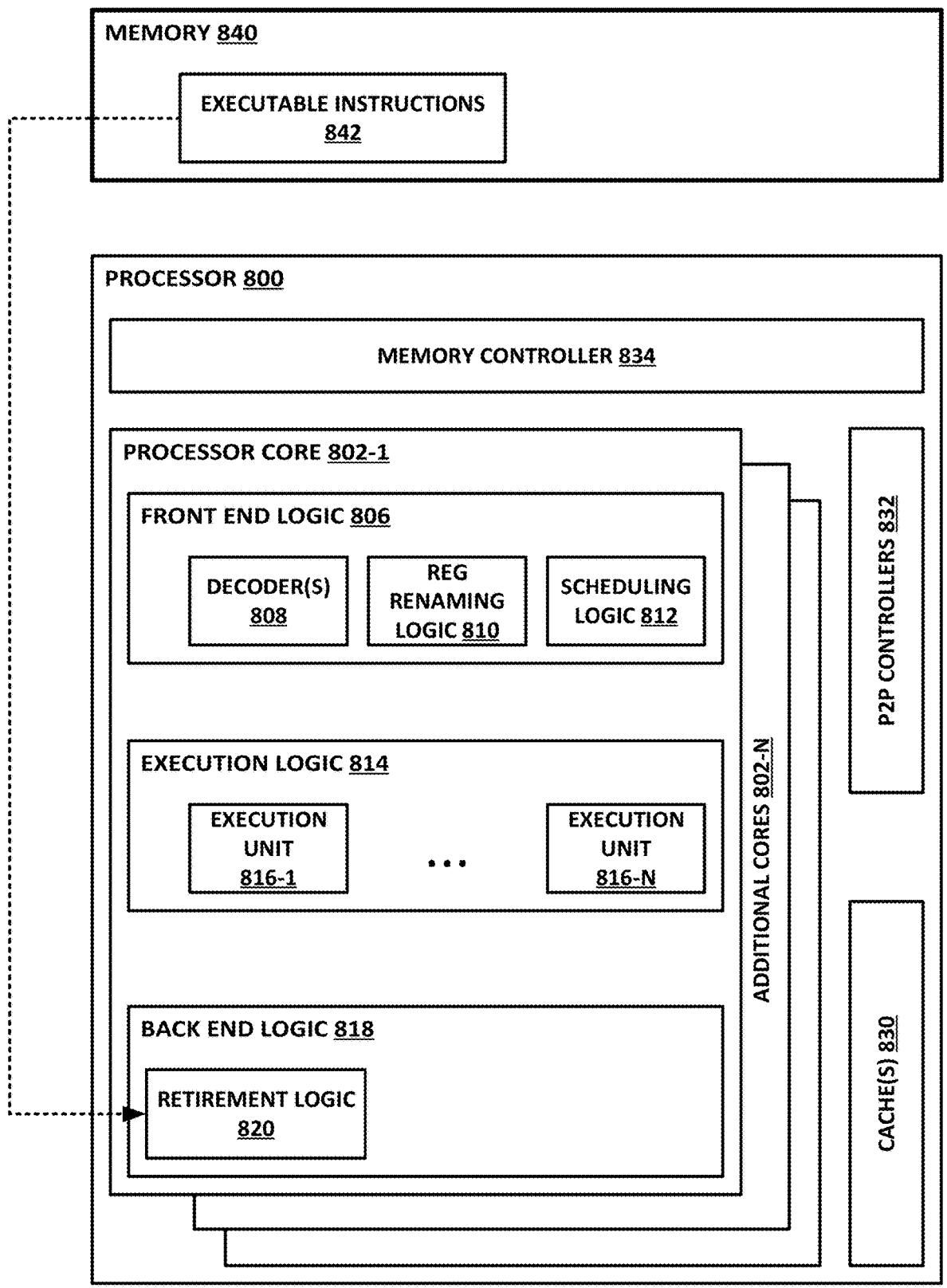
FIG. 8 is a block diagram of selected elements of a processor.

Hardware platform 600 may include several processors 602. For simplicity and clarity, only processors PROC0 602-1 and PROC1 602-2 are shown. Additional processors (such as 2, 4, 8, 16, 24, 32, 64, or 128 processors) may be provided as necessary, while in other embodiments, only one processor may be provided. Details of processors 602 are not illustrated in this FIGURE, but one embodiment is illustrated in FIG. 8. Processors may have any number of cores, such as 1, 2, 4, 8, 16, 24, 32, 64, or 128 cores.

Processors 602 may be any type of processor and may communicatively couple to chipset 616 via, for example, PtP interfaces. Chipset 616 may also exchange data with other elements, such as a high performance graphics adapter 622. In alternative embodiments, any or all of the PtP links illustrated in FIG. 6 could be implemented as any type of bus, or other configuration rather than a PtP link. In various embodiments, chipset 616 may reside on the same die or package as a central processor unit (CPU) 912 or on one or more different dies or packages. Each chipset may support any suitable number of CPUs 602. A chipset 616 (which may be a chipset, uncore, Northbridge, Southbridge, or other suitable logic and circuitry) may also include one or more controllers to couple other components to one or more CPUs.

Two memories, 604-1 and 604-2 are shown, connected to PROC0 602-1 and PROC1 602-2, respectively. As an example, each processor is shown connected to its memory in a direct memory access (DMA) configuration, though other memory architectures are possible, including ones in which memory 604 communicates with processor 610 via a bus. For example, some memories may be connected via a system bus, or in a data center, memory may be accessible in a remote DMA (RDMA) configuration.

Memory 604 may include any form of volatile or non-volatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 604 may be used for short, medium, and/or long-term storage. Memory 604 may store any suitable data or information utilized by platform logic. In some embodiments, memory 604 may also comprise storage for instructions that may be executed by the cores of CPUs 602 or other processing elements (e.g., logic resident on chipsets 616) to provide functionality.

In certain embodiments, memory 604 may comprise a relatively low-latency volatile main memory, while storage 650 may comprise a relatively higher-latency nonvolatile memory. However, memory 604 and storage 650 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 604 and storage 650, for example, in a single physical memory device, and in other cases, memory 604 and/or storage 650 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 622 may be configured to provide a human-readable visual output, such as a command-line interface (CLI) or graphical desktop such as Microsoft Windows, Apple OSX desktop, or a Unix/Linux X Window System-based desktop. Graphics adapter 622 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 622 may include a hardware graphics card, which may have its own memory and its own graphics processing unit (GPU).

Chipset 616 may be in communication with a bus 628 via an interface circuit. Bus 628 may have one or more devices that communicate over it, such as a bus bridge 632, I/O devices 635, network interface 648, accelerators 646, communication devices 640, and a keyboard and/or mouse 638, by way of nonlimiting example. In general terms, the elements of hardware platform 600 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 640 can broadly include any communication not covered by network interface 648 and the various I/O devices described herein. This may include, for example, various universal serial bus (USB), FireWire, Lightning, or other serial or parallel devices that provide communications.

I/O Devices 635 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 642 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 632 may be in communication with other devices such as a keyboard/mouse 638 (or other input devices such as a touch screen, trackball, etc.), communication devices 640 (such as modems, network interface devices, peripheral interfaces such as PCI or PCIe, or other types of communication devices that may communicate through a network), audio I/O devices 642, a data storage device 644, and/or accelerators 646. In alternative embodiments, any portions of the bus architectures could be implemented with one or more PtP links.

Operating system 606 may be, for example, Microsoft Windows, Linux, UNIX, Mac OS X, iOS, MS-DOS, or an embedded or real-time operating system (including embedded or real-time flavors of the foregoing). In some embodiments, a hardware platform 600 may function as a host platform for one or more guest systems that invoke application (e.g., operational agents 608).

Operational agents 608 may include one or more computing engines that may include one or more non-transitory computer-readable mediums having stored thereon executable instructions operable to instruct a processor to provide operational functions. At an appropriate time, such as upon booting hardware platform 600 or upon a command from operating system 606 or a user or security administrator, processor 602 may retrieve a copy of the operational agent (or software portions thereof) from storage 650 and load it into memory 604. Processor 610 may then iteratively execute the instructions of operational agents 608 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 648 may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an Internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 648 may include one or more physical ports that may couple to a cable (e.g., an Ethernet cable, other cable, or waveguide).

In some cases, some or all of the components of hardware platform 600 may be virtualized, in particular the processor(s) and memory. For example, a virtualized environment may run on OS 606, or OS 606 could be replaced with a hypervisor or virtual machine manager. In this configuration, a virtual machine running on hardware platform 600 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 7. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 7:
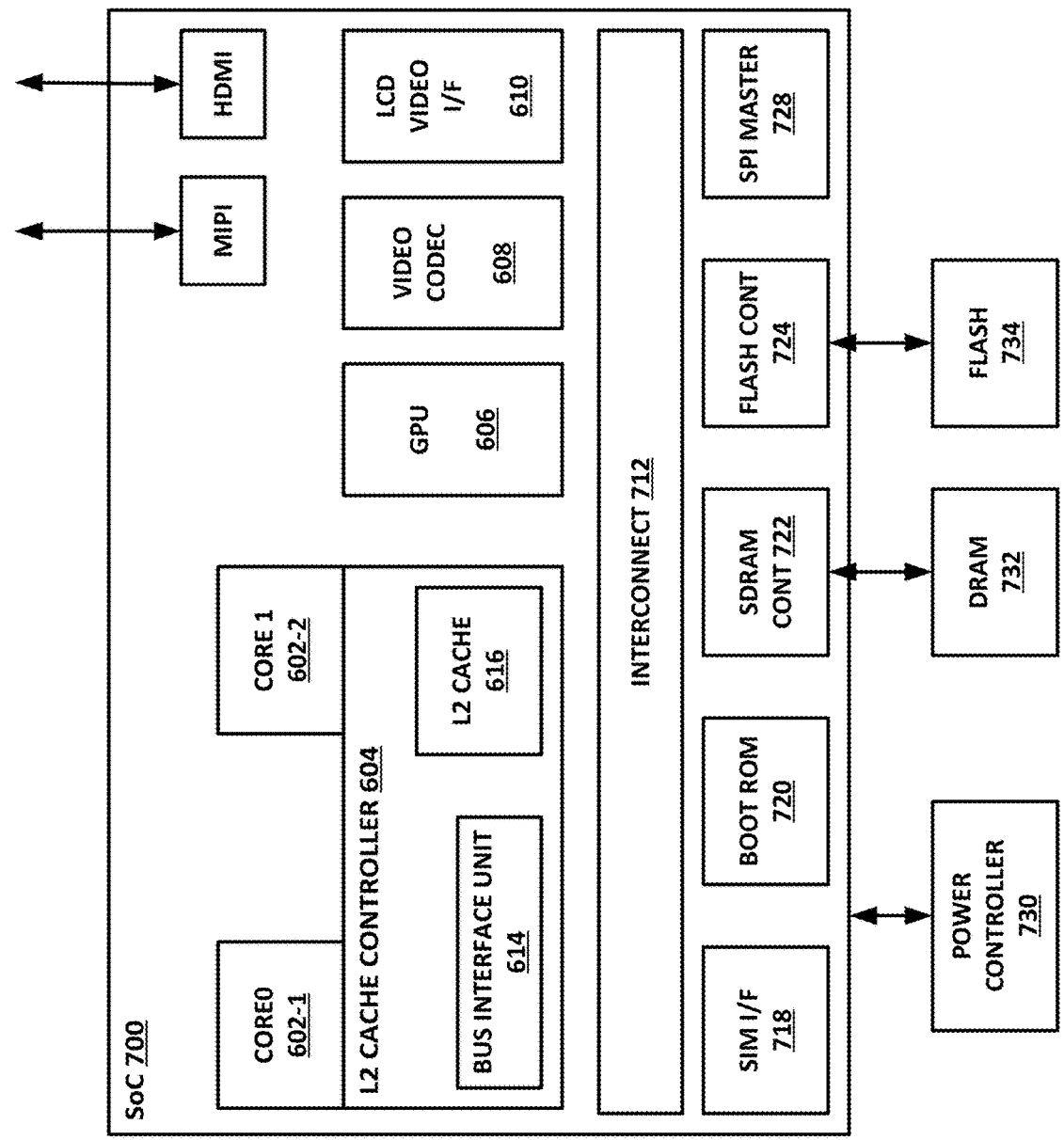
FIG. 7 is a block diagram of selected elements of a system-on-a-chip (SoC).

FIG. 7 is a block illustrating selected elements of an example SoC 700. Embodiments of SoC 700 may be configured or adapted to provide the method of malicious advertisement protection as disclosed in the present specification.

At least some of the teachings of the present specification may be embodied on an SoC 700, or may be paired with an SoC 700. SoC 700 may include, or may be paired with, an advanced reduced instruction set computer machine (ARM) component. For example, SoC 700 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 700 could also be integrated into, for example, a PC, server, video processing components, laptop computer, notebook computer, netbook, or touch-enabled device.

As with hardware platform 600 above, SoC 700 may include multiple cores 702a and 702b. In this illustrative example, SoC 700 also includes an L2 cache control 704, a GPU 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/HDMI links that couple to an LCD.

SoC 700 may also include a subscriber identity module (SIM) I/F 718, a boot ROM 720, a synchronous dynamic random-access memory (SDRAM) controller 722, a flash controller 724, a serial peripheral interface (SPI) master 728, a suitable power control 730, a dynamic RAM (DRAM) 732, and flash 734. In addition, one or more embodiments include one or more communication capabilities, interfaces, and features such as instances of Bluetooth™ 736, a 3G modem 738, a global positioning system (GPS) 740, and an 802.11 Wi-Fi 742.

Designers of integrated circuits such as SoC 700 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 8 is a block diagram illustrating selected elements of a processor 800. Embodiments of processor 800 may be configured or adapted to provide the method of malicious advertisement protection as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 800 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 800 includes one or more processor cores 802, including core 802-1-802-N. Cores 802 may be, as appropriate, single-thread cores or multi-thread cores. In multi-threaded cores, more than one hardware thread may be provided at a time, and the core may therefore provide more than one logical core per physical core. The cores may be configured to execute instruction code. Each processor 800 may include at least one shared cache 830, which may be treated logically as part of memory 840. Caches 830 may be filled according to known caching techniques, and may store instructions and/or data that may be used by one or more components of processor 800.

Processor 800 may include an integrated memory controller (MC) 834, to communicate with memory 840. Memory controller 834 may include logic and circuitry to interface with memory 840, and may also include a cache controller to handle filling and evicting instructions and data to and from cache 830.

By way of example, each core 802 may include front-end logic 806, execution logic 814, and backend logic 818.

In the illustrated embodiment, front-end logic 806 includes an instruction decoder or decoders 808, register renaming logic 810, and scheduling logic 812. Decoder 808 may decode instructions received. Register renaming logic 810 may provide register renaming, for example to facilitate pipelining. Scheduling logic 812 may schedule instruction execution, and may provide out-of-order (OOO) execution. Front-end logic 806 may fetch incoming instructions, perform various processing (e.g., caching, decoding, branch predicting, etc.), and pass instructions to execution logic 814.

Execution logic 814 includes one or more execution units 816-1-816-N. Execution units 816 may include hardware instructions and microcode to carry out the provided instructions.

Backend logic 818 includes retirement logic 820. Core 802 may provide for speculative execution of instructions, branch prediction, and similar. Retirement logic 820 may be configured to determine which predicted instructions were actually needed by the program flow.

Processor 800 may also include a PtP controller 832, which enables connection to an uncore, chipset, Northbridge, Southbridge, or bus, by way of example.

Figure 9:
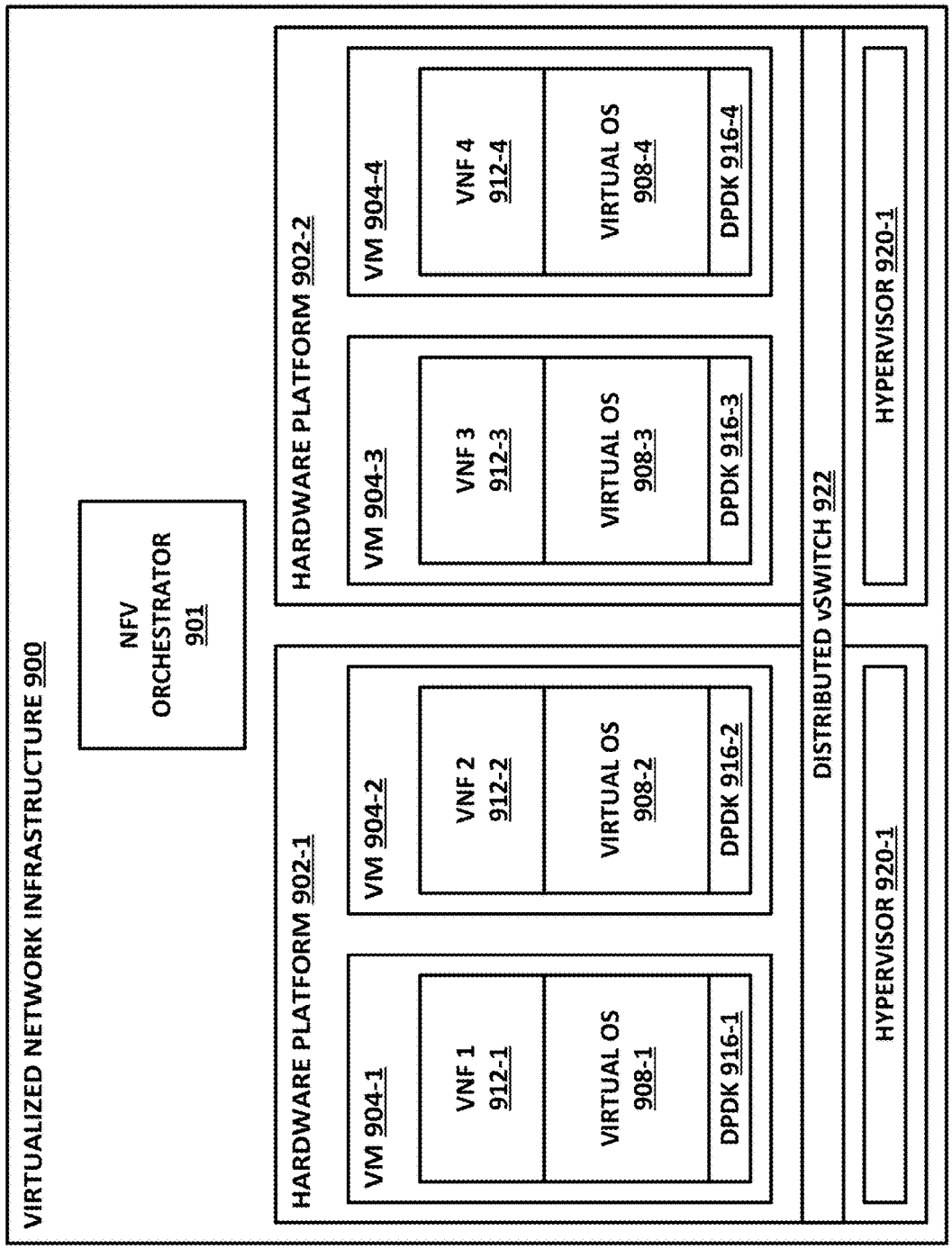
FIG. 9 is a block diagram of selected elements of a network function virtualization (NFV) infrastructure.

FIG. 9 is a block diagram of a network function virtualization (NFV) infrastructure 900. Embodiments of NFV infrastructure 900 may be configured or adapted to provide the method of malicious advertisement protection as disclosed in the present specification.

NFV is an aspect of network virtualization that is generally considered distinct from, but that can still interoperate with, a software defined network (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 9, an NFV orchestrator 901 manages a number of the VNFs 912 running on an NFVI 900. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 901 a valuable system resource. Note that NFV orchestrator 901 may provide a browser-based or graphical configuration interface, and in some embodiments may be integrated with SDN orchestration functions.

Note that NFV orchestrator 901 itself may be virtualized (rather than a special-purpose hardware appliance). NFV orchestrator 901 may be integrated within an existing SDN system, wherein an operations support system (OSS) manages the SDN. This may interact with cloud resource management systems (e.g., OpenStack) to provide NFV orchestration. An NFVI 900 may include the hardware, software, and other infrastructure to enable VNFs to run. This may include a hardware platform 902 on which one or more VMs 904 may run. For example, hardware platform 902-1 in this example runs VMs 904-1 and 904-2. Hardware platform 902-2 runs VMs 904-3 and 904-4. Each hardware platform may include a hypervisor 920, virtual machine manager (VMM), or similar function, which may include and run on a native (bare metal) operating system, which may be minimal so as to consume very few resources.

Hardware platforms 902 may be or comprise a rack or several racks of blade or slot servers (including, e.g., processors, memory, and storage), one or more data centers, other hardware resources distributed across one or more geographic locations, hardware switches, or network interfaces. An NFVI 900 may also include the software architecture that enables hypervisors to run and be managed by NFV orchestrator 901.

Running on NFVI 900 are a number of VMs 904, each of which in this example is a VNF providing a virtual service appliance. Each VM 904 in this example includes an instance of the Data Plane Development Kit (DPDK), a virtual operating system 908, and an application providing the VNF 912.

Virtualized network functions could include, as nonlimiting and illustrative examples, firewalls, intrusion detection systems, load balancers, routers, session border controllers, DPI services, network address translation (NAT) modules, or call security association.

The illustration of FIG. 9 shows that a number of VNFs 904 have been provisioned and exist within NFVI 900. This FIGURE does not necessarily illustrate any relationship between the VNFs and the larger network, or the packet flows that NFVI 900 may employ.

The illustrated DPDK instances 916 provide a set of highly-optimized libraries for communicating across a virtual switch (vSwitch) 922. Like VMs 904, vSwitch 922 is provisioned and allocated by a hypervisor 920. The hypervisor uses a network interface to connect the hardware platform to the data center fabric (e.g., an HFI). This HFI may be shared by all VMs 904 running on a hardware platform 902. Thus, a vSwitch may be allocated to switch traffic between VMs 904. The vSwitch may be a pure software vSwitch (e.g., a shared memory vSwitch), which may be optimized so that data are not moved between memory locations, but rather, the data may stay in one place, and pointers may be passed between VMs 904 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 922 is illustrated, wherein vSwitch 922 is shared between two or more physical hardware platforms 902.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed.

Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example, an advertisement reputation server, comprising: a hardware platform comprising a processor and a memory; a network interface; and an advertisement reputation engine comprising instructions encoded in memory to instruct the processor to: receive via the network interface a plurality of advertisement instances displayed on client devices; extract from the advertisement instances an advertiser identifier; analyze one or more advertisements associated with the advertiser identifier to assign an advertiser reputation; and publish via the network interface advertisement reputation information derived from the reputation for the advertisement identifier.

There is further disclosed an example advertisement reputation server, wherein the reputation engine further comprises instructions to determine that the advertiser reputation is malicious.

There is further disclosed an example advertisement reputation server, wherein the reputation engine further comprises instructions to block advertisements from the malicious advertiser.

There is further disclosed an example advertisement reputation server, wherein the reputation engine further comprises instructions to determine that the advertiser reputation is misleading and not malicious, and to publish a security policy that does not block all advertisements from the misleading advertiser.

There is further disclosed an example advertisement reputation server, wherein the reputation engine further comprises instructions to determine that the advertiser reputation is obscene or contrary to community standards.

There is further disclosed an example advertisement reputation server, wherein the advertiser identifier comprises a tuple comprising a platform identifier and a platform-specific advertiser identifier.

There is further disclosed an example advertisement reputation server, wherein the reputation engine comprises a machine learning algorithm to analyze advertisements with an unknown reputation, or from an advertiser with an unknown reputation.

There is further disclosed an example advertisement reputation server, wherein the reputation engine comprises a feature extractor to extract a plurality of features, and wherein the machine learning algorithm is to analyze the advertisement or advertiser according to the plurality of features.

There is further disclosed an example advertisement reputation server, further comprising a training module to train the machine learning engine on the plurality of features.

There is further disclosed an example advertisement reputation server, wherein the reputation engine further comprises instructions to assign an expiry to a negative advertiser reputation, and after the expiry to re-evaluate the negative advertiser reputation.

There is further disclosed an example advertisement reputation server, wherein analyzing the one or more advertisements associated with the advertiser comprises logistic regression.

There is further disclosed an example advertisement reputation server, wherein analyzing the one or more advertisements associated with the advertiser comprises computing a sum of products.

There is further disclosed an example advertisement reputation server, wherein the reputation engine comprises instructions to analyze the one or more advertisements associated with the advertiser asynchronously with a request.

There is further disclosed an example advertisement reputation server, wherein the reputation engine comprises instructions to publish to a plurality of client devices a policy according to the advertiser reputation.

There is also disclosed an example of one or more tangible, non-transitory computer-readable storage mediums having stored thereon executable instructions to: collect a plurality of advertisements from client devices; identify an advertiser from the plurality of advertisements; assign the advertiser an advertiser identifier; analyze advertisements from the advertiser, and associate a reputation with the advertiser identifier; and publish the reputation to the client devices.

There is further disclosed an example of one or more tangible, non-transitory computer-readable mediums, wherein the instructions are further to determine that the reputation is malicious.

There is further disclosed an example of one or more tangible, non-transitory computer-readable mediums, wherein the instructions are further to deny advertisements from the malicious advertiser.

There is further disclosed an example of one or more tangible, non-transitory computer-readable mediums, wherein the instructions are further to determine that the reputation is misleading and not malicious, and to publish a security policy that does not block advertisements from the misleading advertiser.

There is further disclosed an example of one or more tangible, non-transitory computer-readable mediums, wherein the instructions are further to determine that the advertiser reputation is obscene or contrary to community standards, and to block the advertiser.

There is further disclosed an example of one or more tangible, non-transitory computer-readable mediums, wherein the advertiser identifier comprises a tuple comprising a platform identifier and a platform-specific advertiser identifier.

There is further disclosed an example of one or more tangible, non-transitory computer-readable mediums, wherein the instructions provide a machine learning algorithm.

There is further disclosed an example of one or more tangible, non-transitory computer-readable mediums, wherein the instructions provide a feature extractor to extract a plurality of features, and wherein the machine learning algorithm is to analyze advertisements from the advertiser according to the plurality of features.

There is further disclosed an example of one or more tangible, non-transitory computer-readable mediums, wherein the instructions further provide a training module to train the machine learning engine on the plurality of features.

There is further disclosed an example of one or more tangible, non-transitory computer-readable mediums, wherein the instructions are to assign an expiry to an advertiser reputation, and after the expiry to re-evaluate the advertiser reputation.

There is further disclosed an example of one or more tangible, non-transitory computer-readable mediums, wherein assigning the reputation comprises logistic regression.

There is further disclosed an example of one or more tangible, non-transitory computer-readable mediums, wherein assigning the reputation comprises computing a sum of products.

There is further disclosed an example of one or more tangible, non-transitory computer-readable mediums, wherein the instructions are to analyze the advertisements asynchronously with a request.

There is further disclosed an example of one or more tangible, non-transitory computer-readable mediums, wherein the instructions are to publish to a plurality of client devices a policy according to the advertiser reputation.

There is also disclosed a computer-implemented method of providing advertiser reputations, comprising: collecting advertisements provided by an advertising platform to client devices; assigning an advertiser on the advertising platform a unique advertiser identifier; providing the advertiser an advertiser reputation according to an analysis of advertisements from the advertiser; and generating a security policy based on the advertiser reputation.

There is further disclosed an example method, further comprising determining that the advertiser reputation is malicious.

There is further disclosed an example method, further comprising denying advertisements from the malicious advertiser.

There is further disclosed an example method, further comprising determining that the reputation is misleading and not malicious, wherein the security policy does not block the misleading advertiser.

There is further disclosed an example method, further comprising determining that the advertiser reputation is obscene or contrary to community standards, wherein the security policy is to block the obscene advertiser.

There is further disclosed an example method, wherein the advertiser identifier comprises a tuple comprising a platform identifier and a platform-specific advertiser identifier.

There is further disclosed an example method, further comprising providing analysis via a machine learning algorithm.

There is further disclosed an example method, further comprising providing a feature extractor to extract a plurality of features, and wherein the machine learning algorithm is to analyze advertisements from the advertiser according to the plurality of features.

There is further disclosed an example method, further comprising providing a training module to train the machine learning engine on the plurality of features.

There is further disclosed an example method, further comprising assigning an expiry to an advertiser reputation.

There is further disclosed an example method, wherein assigning the reputation comprises logistic regression.

There is further disclosed an example method, wherein assigning the reputation comprises computing a sum of products.

There is further disclosed an example method, further comprising analyzing the advertisements asynchronously with a request.

There is further disclosed an example method, further comprising publishing the security policy to a plurality of client devices.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method a number of the above examples.

There is also disclosed an example apparatus, wherein the apparatus is a computing system.

There is also disclosed an example of at least one computer-readable medium comprising instructions that, when executed, implement a method or realize an apparatus as claimed in a number of the above examples.

What is claimed is:

1. An advertisement reputation server, comprising:
   a hardware platform comprising a processor and a memory;
   a network interface; and
   an advertisement reputation engine comprising instructions encoded in memory to instruct the processor to:
      receive via the network interface a plurality of advertisement instances displayed on client devices;
      extract from the advertisement instances an advertiser identifier;
      analyze one or more advertisements associated with the advertiser identifier to assign an advertiser reputation, comprising applying a machine learning algorithm to the analysis if an advertisement has an unknown reputation, or is from an advertiser with an unknown reputation; and
      publish via the network interface advertisement reputation information derived from the reputation for the advertisement identifier.

2. The advertisement reputation server of claim 1, wherein the reputation engine further comprises instructions to determine that the advertiser reputation is a malicious advertiser.

3. The advertisement reputation server of claim 2, wherein the reputation engine further comprises instructions to block advertisements from the malicious advertiser.

4. The advertisement reputation server of claim 1, wherein the reputation engine further comprises instructions to determine that the advertiser reputation is a misleading advertiser and nota malicious advertiser, and to publish a security policy that does not block all advertisements from the misleading advertiser.

5. The advertisement reputation server of claim 1, wherein the reputation engine further comprises instructions to determine that the advertiser reputation is obscene or contrary to community standards.

6. The advertisement reputation server of claim 1, wherein the advertiser identifier comprises a tuple comprising a platform identifier and a platform-specific advertiser identifier.

7. The advertising reputation server of claim 1, wherein the reputation engine comprises a feature extractor to extract a plurality of features, and wherein the machine learning algorithm is to analyze the advertisement or advertiser according to the plurality of features.

8. The advertising reputation server of claim 7, further comprising a training module to train the machine learning engine on the plurality of features.

9. The advertisement reputation server of claim 1, wherein the reputation engine further comprises instructions to assign an expiry to a negative advertiser reputation, and after the expiry to re-evaluate the negative advertiser reputation.

10. The advertisement reputation server of claim 1, wherein analyzing the one or more advertisements associated with the advertiser comprises logistic regression.

11. The advertisement reputation server of claim 1, wherein analyzing the one or more advertisements associated with the advertiser comprises computing a sum of products.

12. The advertisement reputation server of claim 1, wherein the reputation engine comprises instructions to analyze the one or more advertisements associated with the advertiser asynchronously with a request.

13. The advertisement reputation server of claim 1, wherein the reputation engine comprises instructions to publish to a plurality of client devices a policy according to the advertiser reputation.

14. One or more tangible, non-transitory computer-readable storage mediums having stored thereon executable instructions to:
    collect a plurality of advertisements from client devices;
    identify an advertiser from the plurality of advertisements;
    assign the advertiser an advertiser identifier;
    analyze advertisements from the advertiser, comprising applying a machine learning algorithm to the analysis if an advertisement has an unknown reputation, or is from an advertiser with an unknown reputation, and associate a reputation with the advertiser identifier; and
    publish the reputation to the client devices.

15. The one or more tangible, non-transitory computer-readable mediums of claim 14, wherein the instructions are further to determine that the reputation is a malicious advertiser.

16. The one or more tangible, non-transitory computer-readable mediums of claim 15, wherein the instructions are further to deny advertisements from the malicious advertiser.

17. The one or more tangible, non-transitory computer-readable mediums of claim 14, wherein the instructions are further to determine that the reputation is a misleading advertiser and nota malicious advertiser, and to publish a security policy that does not block advertisements from the misleading advertiser.

18. A computer-implemented method of providing advertiser reputations, comprising:
    collecting advertisements provided by an advertising platform to client devices;
    assigning an advertiser on the advertising platform a unique advertiser identifier;
    providing the advertiser an advertiser reputation according to an analysis of advertisements from the advertiser, comprising applying a machine learning algorithm to the analysis if an advertisement has an unknown reputation, or is from an advertiser with an unknown reputation; and
    generating a security policy based on the advertiser reputation.

19. The method of claim 18, further comprising determining that the advertiser reputation is malicious.

* * * * *

UNITED STATES PATENT AND TRADEMARK OFFICE
CERTIFICATE OF CORRECTION

| | |
|---|---|
| PATENT NO. | : 11,399,033 B2 |
| APPLICATION NO. | : 16/451185 |
| DATED | : July 26, 2022 |
| INVENTOR(S) | : Joel R. Spurlock et al. |

It is certified that error appears in the above-identified patent and that said Letters Patent is hereby corrected as shown below:

In the Claims

In Column 28, Claim 4, Line 47, delete "nota" and insert -- not a --, therefor.

In Column 28, Claim 7, Line 58, delete "advertising" and insert -- advertisement --, therefor.

In Column 28, Claim 8, Line 63, delete "advertising" and insert -- advertisement --, therefor.

In Column 30, Claim 17, Line 12, delete "nota" and insert -- not a --, therefor.

Signed and Sealed this
First Day of November, 2022

Katherine Kelly Vidal
*Director of the United States Patent and Trademark Office*